United States Patent [19]

Krupa et al.

[11] Patent Number: 4,995,721
[45] Date of Patent: Feb. 26, 1991

[54] TWO-DIMENSIONAL SPECTROMETER

[75] Inventors: Robert J. Krupa, Leominster; R. Calvin Owen, Lincoln, both of Mass.

[73] Assignee: Imo Industries, Inc., Princeton, N.J.

[21] Appl. No.: 488,293

[22] Filed: Mar. 5, 1990

[51] Int. Cl.⁵ .............................. G01J 3/18; G01J 3/36
[52] U.S. Cl. ..................................... 356/305; 356/328
[58] Field of Search ............... 356/302, 305, 324, 326, 356/328, 331–334

[56] References Cited

PUBLICATIONS

Meinel, SPIE, vol. 172, Instrumentation in Astroonomy III, 1979, pp. 432–438.

*Primary Examiner*—F. L. Evans
*Attorney, Agent, or Firm*—Hopgood, Calimafde, Kalil, Blaustein & Judlowe

[57] ABSTRACT

A double-pass two-dimensional spectrometer utilizes a telescope wich contains only reflective optical components and is therefore free of chromatic aberrations. The telescope is so used in combination with dispersing optics as to allow double-pass use of the combination. The telescope has a state of correction such that, for example, an image which is diffraction-limited at 800 nm is produced over a flat field, corresponding to a wide-angle object coverage. This state of correction is accomplished with only two mirrors, one of which is a conic (e.g., hyperbolic) surface of revolution, while the other is a reflecting generalized polynomial aspheric corrector; and both mirrors are rotationally symmetric surfaces of revolution, each about its own axis of revolution. The double-pass nature of the system allows for a compact optical system consisting of only two reflecting surfaces, plus the dispersing optics, and there are no internal obscurations, thus avoiding negative effects of diffraction off of internal structures. The invention is shown for its applicability to each of several types of spectrometer-design configurations.

21 Claims, 3 Drawing Sheets

TWO-DIMENSIONAL SPECTROMETER

BACKGROUND OF THE INVENTION

The invention relates to two-dimensional spectrometers, wherein light to be analyzed enters an aperture and is subjected to cross-dispersion involving use of an echelle grating, and wherein a reflecting optical system images the aperture as a dispersed-light pattern at a focal plane.

Pending Tobias application Ser. No. 450,027, filed Dec. 13, 1989, contains an introductory discussion of spectrometers, and reference is made to said application for a background statement, particularly with respect to attempts to use an echelle grating and a two-dimensional detector array at the focal plane of the system. Bilhorn, et al. papers in *Applied Spectroscopy* (Vol. 41, No. 7, 1987, at pages 1125 to 1135; and Vol. 43, No. 1, 1989 at pages 1 to 11) are disclosed as representative of the state of the art, namely, a spectrometer as a single-pass system, from light source to image plane, with an echelle grating and a prism to produce cross-dispersion, and an off-axis Schmidt camera to reduce the size of the focal-plane image to match the dimensions of a two-dimensional detector array. The primary disadvantages of such a spectrometer are its slow optical speed, and its large, clumsy and expensive construction. The Tobias application seeks to avoid such disadvantages by providing a single catadioptric system as the collimator and the camera for two-pass use of a variety of two-dimensionally dispersed spectrometers, and off-axis aberration effects are minimized by arranging a fiber optic as the light-entrance aperture, on the central optical axis of the spectrometer and in close proximity to, or centrally inserted in a two-dimensional array detector at the image plane.

But neither the single-pass system of Bilhorn, et al. nor the two-pass system of Tobias addresses the problem of chromatic aberration, which is inherent in both systems.

BRIEF STATEMENT OF THE INVENTION

It is an object of the present invention to provide an improved two-dimensional spectrometer, avoiding disadvantages of prior art devices.

It is a specific object to provide a compact and inherently less expensive spectrometer of the character indicated, wherein the spectrometer is inherently free of chromatic aberration, while also achieving the Tobias objective of minimized astigmatism, finer inherent resolution and greater wavelength range, as compared with prior spectrometers.

The invention achieves these objects by using a telescope which contains only reflective optical components and is therefore free of chromatic aberrations. The telescope is so used in combination with dispersing optics as to allow double-pass use of the combination. The telescope has a state of correction such that, for example, an image which is diffraction-limited at 800 nm is produced over a flat field, corresponding to a wide-angle object coverage. This state of correction is accomplished with only two mirrors, one of which is a conic (e.g., hyperbolic) surface of revolution, while the other is a reflecting generalized polynomial aspheric corrector; and both mirrors are rotationally symmetric surfaces of revolution, each about its own axis of revolution. The double-pass nature of the system allows for a compact optical system consisting of only two reflecting surfaces, plus the dispersing optics, and there are no internal obscurations, thus avoiding negative effects of diffraction off of internal structures. The invention is shown for its applicability to each of several types of spectrometer-design configurations.

DETAILED DESCRIPTION OF THE INVENTION

Several application embodiments of the invention will be described in detail, in conjunction with the accompanying drawings, in which.

Figure 1:
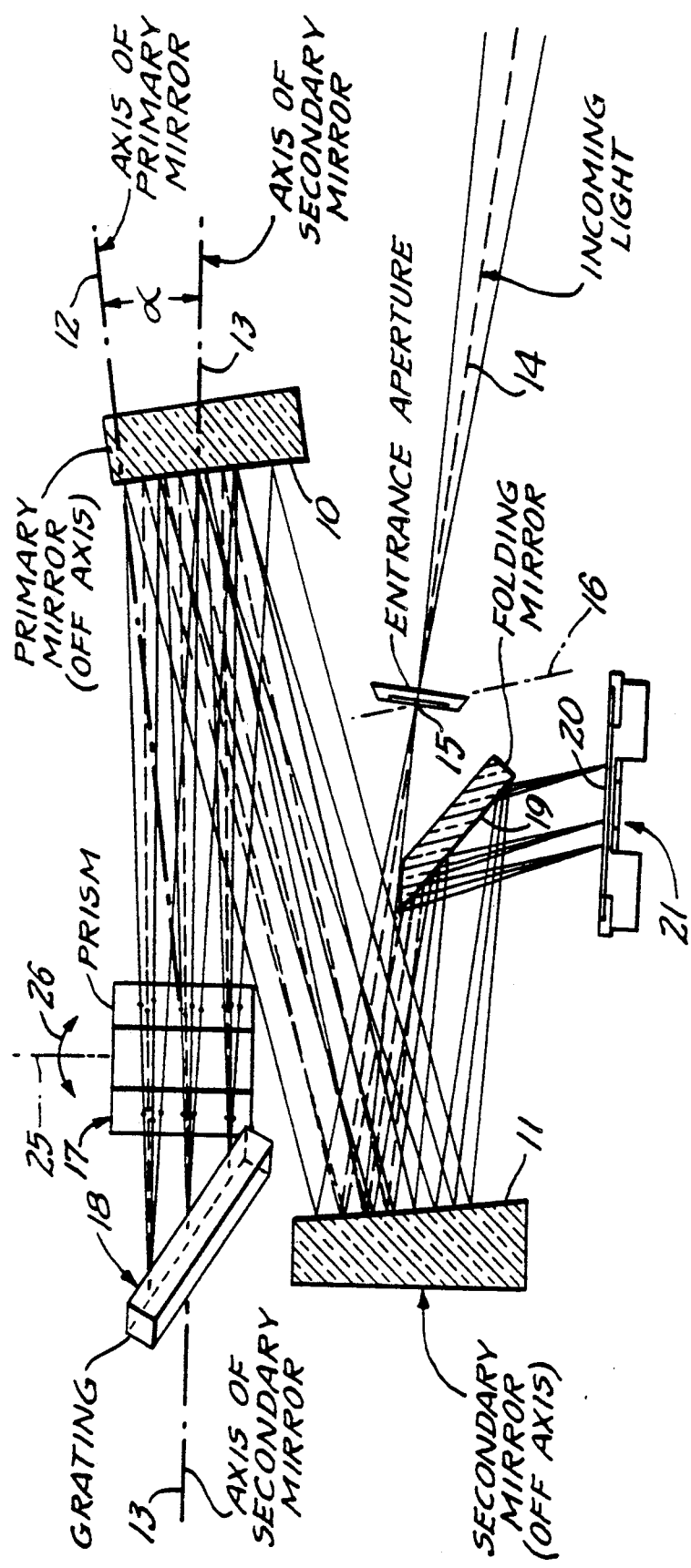
FIG. 1 is an optical block diagram for a first category of two-dimensional spectrometer incorporating the invention.

As noted above, the invention involves double-pass use of only two reflecting surfaces, in combination with dispersing optics, and the two reflecting surfaces comprise a telescope system. For this reason, the two reflecting surfaces will be described and referenced in telescope terms, namely, as a primary mirror 10 and a secondary mirror 11. Each of these mirrors is an off-axis segment of a surface of revolution about its own axis, namely, axis 12 for the primary mirror 10 and axis 13 for the secondary mirror 11. The optical properties of mirrors 10/11 are such that incoming light to be analyzed enters the system on an axis 14 through an aperture 15 (and thus as a point source on axis 14 and in a geometric plane 16), and after successive reflection by mirrors 11/10, emerges as a collimated beam centered on and therefore parallel to the axis 13 of the secondary mirror 11. Dispersing optics in the collimated beam are shown to comprise a prism 17 and a grating 18, preferably an echelle grating. Light dispersed by grating 18 is reflected back to the primary mirror 10, after cross-dispersion in its passage through prism 17; the cross-dispersed light reflected by mirrors 10/11 is focused at the geometric plane 16 which contains the entrance aperture. And in the form shown, for simplicity and ease of diffraction-image detection, a flat folding mirror 19 is shown to fold the diffraction-image (focal) plane away from the geometric plane 16, to focus the diffraction image in the flat-field radiation-sensitive surface 20 of a suitable detector array 21, at a lateral side of the system.

The flat-field device 21 is preferably a two-dimensional photo-responsive array device, with upward of $10^6$ discrete elements contained with an area of approximately 1-cm square. Such a device is commercially available from Texas Instruments. Electronic means for responding effectively concurrently to all of these discrete elements are available and understood in the art and are therefore neither shown nor described at this time.

More specifically, as to the two reflecting elements of the telescope system, the secondary mirror 11 is an off-axis segment of a conic surface of revolution about its axis 13 of revolution. Suitably and preferably, this conic surface is a hyperbola, which is a well-known figure which lends itself to fabrication and test independent of the overall system. The primary mirror 10 is also a rotationally symmetric surface of revolution, about its axis 12 of revolution; this primary surface is a segment of a higher-order generalized asphere wherein the higher order is at least four, but preferably at least eight.

The axis 12 of revolution of the primary-mirror surface is in the same geometric plane as axes 13 and 14; and axes 12/13 intersect at entry to the dispersing optics, being inclined at an angle α, which may suitably be 10 degrees. With a doubly-reflecting telescope of the indicated character, overall-length requirements are reduced by nearly a factor of two, as related to focal length. Thus, a two-mirror (10/11) system having a focal length of 175 mm, focal ratio f/10, and field of view of 6 degrees, can be accommodated within an instrument package of about 10-cm overall length; and for α in the order of 10 degrees, the provision of neither the entrance aperture 15 nor the folding mirror 19 gives rise to internal structure which in any way interferes with any of the involved internal ray paths. The telescope is free of chromatic aberrations and has a state of correction such that, for the case of diffraction-limiting at 800 nm, a two-dimensional spectral image is produced over the wide spectral range from approximately 170 nm to 800 nm. And this spectral image can be focused onto a small, flat, two-dimensional array detector such as a charge-injection device (CID), charge-coupled device (CCD), photodiode array (PDA), image tube (Reticon, Vidicon, etc.), or photographic plate. It is to be understood that the specific dimensions recited above are for illustration only, in that the telescope focal length of 175 mm was chosen to match the range of angles of a given echelle grating to the size and formulation of a two-dimensional array detector, for a given spectral range.

The foregoing description and discussion with respect to a two-pass internally reflecting spectrometer will serve the further purpose of illustrating several variations, for particular singular purposes. Thus, to provide a single-order echelle spectrograph, prism 17 may be mounted for rotation on an axis 25 generally transverse to the collimated-beam axis 13, whereby the light impinging upon a linear-array detector at 20 will be composed of only one order of the diffracted spectrum, as defined by the prism 17 and echelle diffraction grating 18; a double-headed arcuate directional symbol 26 will be understood to indicate selective rotation of prism 17, for selecting the spectral order of admitted light to be further dispersed by grating 18. In this illustration, the linear array of detectors at 20 may be a linear array of photodiodes, or of charge-coupled devices, or of charge-injection devices, and whatever the nature of elements in the linear array, detector response will consist of only one order of the diffracted-light spectrum.

Figure 2:
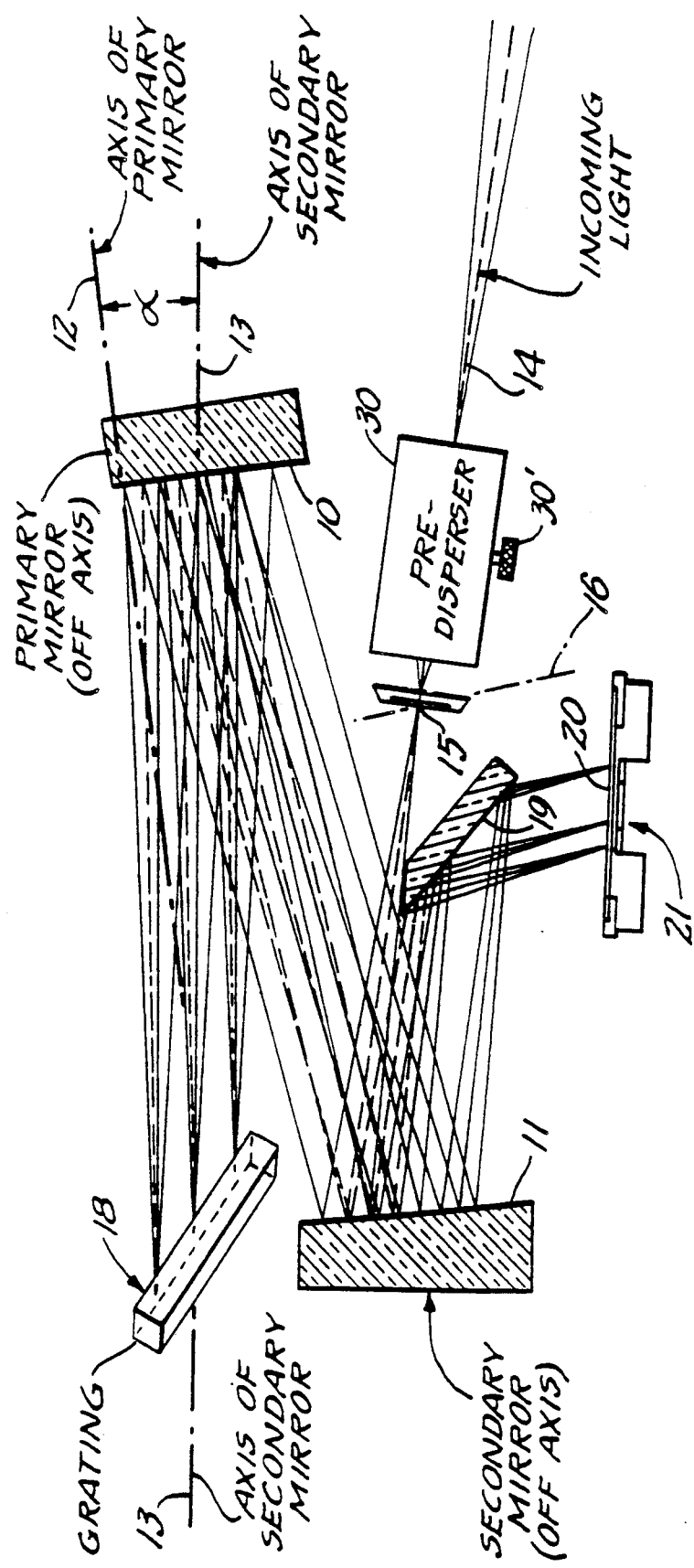
FIG. 2 is a similar diagram for the invention in application to a second spectrometer category.

With equally simple modification, the two-pass internally reflecting instrument of FIG. 1 may also be a single-order spectrograph with predisperser, wherein, as suggested by the simplified diagram of FIG. 2, the prism 17 is replaced by an external predisperser 30, which may be a bandpass filter, or an interferometer, or a wide-pass grating monochromator, or a prism monochromator. Predisperser 30 selects the spectral order which will be incident upon the echelle grating, being there diffracted, reflected back and imaged on a linear detector array at 20; a knob 30' will be understood to indicate variation at 30 to observe a selected spectral order of interest. As previously noted, the array 20 may consist of a linear arrangement of photodiodes, charged-coupled devices or charge-injection devices.

Figure 3:
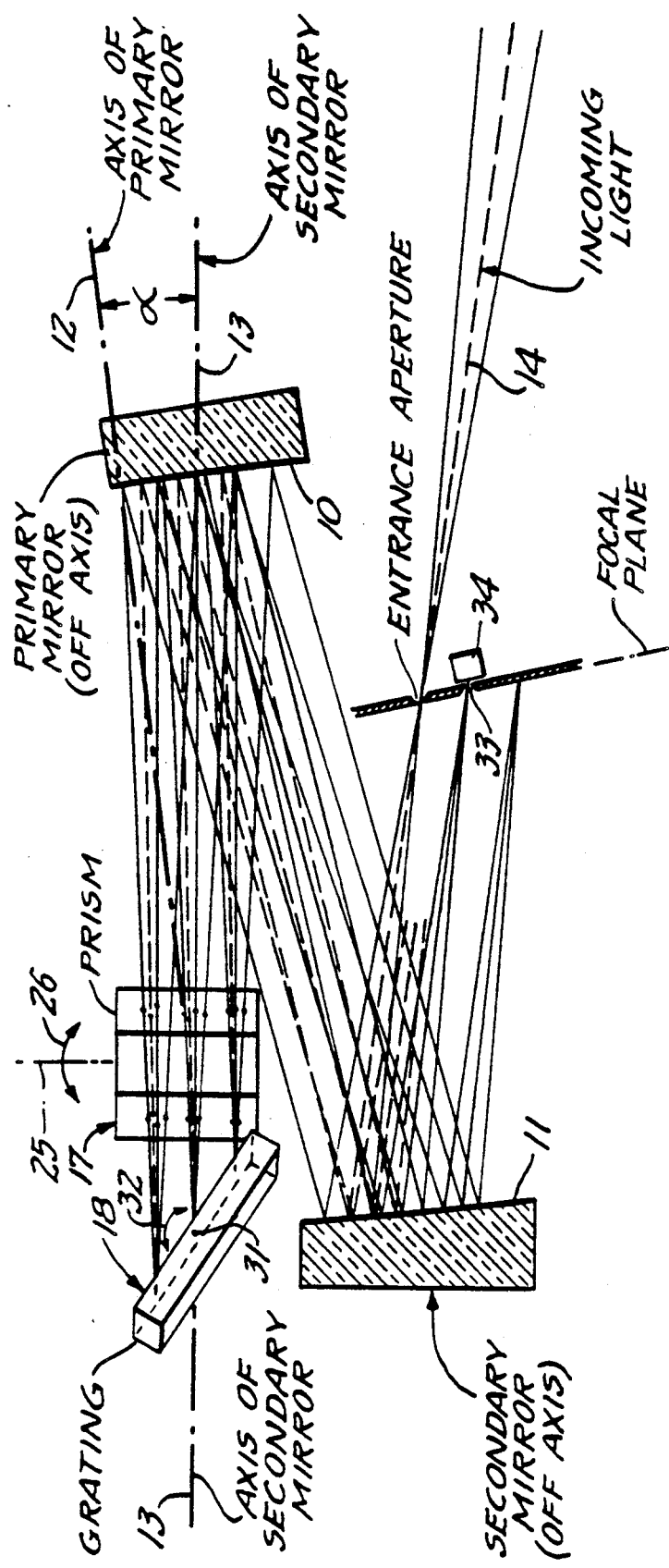
FIG. 3 is another similar diagram for a third category of spectrometer.

Still further, as will be seen from FIG. 3, the basic configuration described in connection with FIG. 1 lends itself, with simple modification, to provide an echelle monochromator wherein the prism 17 is again mounted for rotation on axis 25 (i.e., generally transverse to collimated-beam axis 13), and wherein the echelle grating 18 is also mounted for rotation, about an axis 31 which is generally transverse to axis 13 and orthogonal to axis 25; the rotation about axis 31 is selectively adjustable, as suggested by a double-headed arcuate symbol 32. In FIG. 3, an exit slit 33 is seen to be at offset from the entrance aperture 15 and also in the focal plane 16 of the instrument. Slit 33 will be understood to be elongate in the direction perpendicular to the plane of FIG. 3 and to determine spectrally dispersed exposure to a photodetector 34 behind the slit.

As noted above, the same basic optical configuration, relying on mirrors 10-11, will serve a variety of specific purposes. Therefore, it will suffice to provide a single set of equations for definition of the respective mirror surfaces. An exact equation for describing the hyperbolic secondary mirror is:

$$Z = \frac{(CURV)Y^2}{1 + [1 - (1 + K)(CURV)^2 Y^2]^{0.5}}$$

where,
CURV = 0.00258455
K = −21.250
And an exact equation for describing the aspheric primary is:

$$Z = \frac{(CURV)Y^2}{1 + [1 - (CURV)^2 Y^2]^{0.5}} + (A)Y^4 + (B)Y^6 + (C)Y^8$$

where,
CURV = −0.00166055
A = −2.85943 × 10$^{-8}$
B = 9.91468 × 10$^{-12}$
C = −2.08601 × 10$^{-15}$

What is claimed is:
1. A two-dimensional spectrometer, having an entrance aperture for admission of light along an optical path to a primary mirror via a secondary mirror, and for reflection as a collimated-light beam from said primary mirror to a two-dimensional dispersive optical device effectively normal to the collimated beam, said dispersive optical device producing a reflected cross-dispersed beam back via said primary and secondary mirrors to a focal plane which effectively includes said entrance aperture, and a two-dimensional detector array in said focal plane and with at least some of its detector elements optically adjacent said optical path and optically facing back-reflected two-dimensionally dispersed light.

2. A two-dimensional spectrometer, having an entrance aperture for admission of light along an optical path, a reflecting/correcting system comprising primary and secondary mirrors for twice folding said path and for producing from light on said path a collimated beam of twice-reflected light, a two-dimensional dispersive optical device effectively normal to the collimated beam, said dispersive optical device producing a reflected cross-dispersed beam back via said primary and second mirrors to a focal plane which effectively includes said entrance aperture, and a two-dimensional detector array in said focal plane and with at least some of its detector elements optically adjacent said optical path and optically facing back-reflected two-dimensionally dispersed light.

3. The spectrometer of claim 1 or claim 2, in which a plane mirror inclined to and adjacent said path and between said aperture and said secondary mirror is operative to fold the back-reflected and two-dimensionally dispersed light in a direction generally transverse to the direction of back-reflected light incident thereon.

4. The spectrometer of claim 1 or claim 2, in which said secondary mirror is a segment of a hyperbolic curve of revolution about an axis substantially parallel to the direction of said collimated beam.

5. The spectrometer of claim 1 or claim 2, in which said secondary mirror is a segment of a hyperbolic curve of revolution about an axis substantially aligned with the central axis of said collimated beam.

6. The spectrometer of claim 1 or claim 2, in which said primary mirror is a segment of a higher-order generalized asphere wherein said higher order is at least four, said asphere being a surface of revolution about an axis inclined to the axis of the collimated beam and generally in the geometric plane defined by said path at incidence with and reflection from said primary mirror.

7. The spectrometer of claim 1 or claim 2, in which the central axis of path to said secondary mirror, and from said secondary to said primary mirror, and along said collimated beam, lies essentially in a single geometric plane.

8. The spectrometer of claim 1 or claim 2, in which said dispersive optical device includes an element mounted for rotation about an axis transverse to the direction of the collimated beam.

9. The spectrometer of claim 1 or claim 2, in which said dispersive optical device includes a prism and an echelle grating.

10. The spectrometer of claim 1 or claim 2, in which said dispersive optical device is a cross-ruled reflecting grating.

11. The two-dimensional spectrometer of claim 1 or claim 2, in which said dispersive optical device comprises a prism component and an echelle-grating component, one of said components being rotatable about an axis transverse to the direction of said collimated beam.

12. The two-dimensional spectrometer of claim 1 or claim 2, in which said dispersive optical device comprises a prism component and an echelle-grating component, both of said components being rotatable about an axis transverse to the direction of said collimated base, the respective axes about which said components are rotatable being orthogonally related.

13. A wide-spectral range, flat field, double-pass spectrometer, comprising a telescope system having an external entrance pupil, and a two-dimensional dispersive optical system positioned at the external entrance pupil of said telescope system; said telescope system comprising an eccentric-segment primary mirror and an eccentric-segment secondary mirror of conic section, wherein for collimated light incident upon said primary mirror and successively reflected by said mirrors, a focal plane exists after secondary-mirror reflection and at such axial offset from said secondary mirror as to provide at least a portion of the focal plane out of potential interference with light reflected by and between said mirrors; an entrance aperture in said focal-plane portion for a beam of light entering via said aperture and for successive reflection by said secondary and primary mirrors, to thereby convert said beam to a collimated beam upon reflection by said primary mirror; said two-dimensional dispersive optical system being so positioned in said collimated beam as to reflect two-dimensionally dispersed light back to said primary mirror and, by reflection to and from said secondary mirror, to focus in said focal-plane portion; and a multi-element detector array in said focal-plane portion.

14. The spectrometer of claim 13, wherein said multi-element detector array is means selected from the group consisting of a photographic film, a photodiode array, a charge-injection device, a charge-coupled device, and a vidicon camera.

15. The spectrometer of claim 13, in which the conic section of said secondary-mirror segment is hyperbolic, being a surface defined by a hyperbolic figure of revolution about an axis eccentric to the segment.

16. The spectrometer of claim 15, in which
primary mirror is a fourth or higher-order generalized asphere.

17. The spectrometer of claim 16, in which the higher order is at least eight.

18. A spectrometer having an entrance aperture for admission of light along an optical path to a primary mirror via a secondary mirror, and for reflection as a collimated-light beam from said primary mirror to an echelle grating effectively normal to the collimated beam, said grating producing a reflected dispersed beam back via said primary and secondary mirrors to a focal plane which effectively includes said entrance aperture, a predisperser positioned to disperse light admitted on said path via said entrance aperture, said predisperser determining the spectral order of light admitted by said entrance aperture, and a single-dimensional multi-element detector array in said focal plane and optically facing at least a fraction of the back-reflected light.

19. The spectrometer of claim 18, in which said predisperser includes adjustable means for effectively selecting the spectral order admitted by said entrance aperture.

20. The spectrometer of claim 18, in which said predisperser is means selected from the group consisting of a bandpass filter, an interferometer, a wide bandpass grating monochromator, and a prism monochromator.

21. The spectrometer of claim 18, in which said detector array is a linear array of detector elements, selected form the group consisting of photodiodes, charge-coupled devices, and charge-injection devices.

* * * * *